United States Patent
Corigliano et al.

(10) Patent No.: US 8,388,497 B2
(45) Date of Patent: Mar. 5, 2013

(54) METHOD FOR CONTROLLING THE UPSHIFT OPERATION IN A MOTOR VEHICLE EQUIPPED WITH A DOUBLE CLUTCH TRANSMISSION

(75) Inventors: Emanuel Corigliano, Orbassano (IT); Giancarlo Osella, Orbassano (IT); Attilio Porta, Orbassano (IT); Dario Del Pin, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 683 days.

(21) Appl. No.: 12/565,405

(22) Filed: Sep. 23, 2009

(65) Prior Publication Data
US 2010/0113219 A1    May 6, 2010

(30) Foreign Application Priority Data
Oct. 1, 2008  (EP) .................................... 08425642

(51) Int. Cl.
  *B60W 10/04* (2006.01)
(52) U.S. Cl. ....................................................... 477/110
(58) Field of Classification Search ............... 477/170, 477/180, 181, 110, 111
See application file for complete search history.

(56) References Cited

U.S. PATENT DOCUMENTS

| 5,407,401 A | 4/1995 | Bullmer et al. |
| 5,669,851 A * | 9/1997 | Tietze ........................... 477/109 |
| 7,704,189 B2 * | 4/2010 | Baur et al. .................... 477/180 |
| 2005/0037893 A1 | 2/2005 | Siebigteroth et al. |

FOREIGN PATENT DOCUMENTS

DE    199 39 334 A1    3/2001

* cited by examiner

*Primary Examiner* — David D Le
*Assistant Examiner* — David J Hlavka
(74) *Attorney, Agent, or Firm* — Sughrue Mion, PLLC

(57) ABSTRACT

According to the method the crossover phase of the friction clutches is performed by defining a linear torque profile for the first friction clutch having a given initial value and a zero final value, a linear torque profile for the second friction clutch having a zero initial value and a given final value, and a linear torque profile for the engine having a given initial value and a given final value. The final value of the torque profile of the second friction clutch is calculated, the initial value of the engine torque being known, by determining a final value of the longitudinal acceleration of the vehicle equal to a given percentage of the initial value of the longitudinal acceleration of the vehicle. The final value of the engine torque profile is calculated, the final value of the torque profile of the second friction clutch being known, on the basis of the final value determined for the longitudinal acceleration of the vehicle. The initial value of the torque profile of the first friction clutch is chosen so as to be greater than a minimum value calculated by determining the condition of synchronism of the driving shaft and of the first primary shaft.

10 Claims, 3 Drawing Sheets

METHOD FOR CONTROLLING THE UPSHIFT OPERATION IN A MOTOR VEHICLE EQUIPPED WITH A DOUBLE CLUTCH TRANSMISSION

BACKGROUND OF THE INVENTION

The present invention relates to a method for controlling the operation of changing to a higher gear (upshift) in a motor vehicle equipped with a double clutch transmission.

With reference to FIG. 1 of the accompanying drawings, a typical double clutch transmission for a motor vehicle is generally indicated 10 and comprises a first primary shaft 12 carrying a plurality of driving gearwheels (only one of which is schematically shown and is indicated 14) associated with a first set of gears (for example the odd gears), a second primary shaft 16 carrying a plurality of driving gearwheels (only one of which is schematically shown and is indicated 18) associated with the remaining gears (for example the even gears), a first friction clutch 20 designed to couple the first primary shaft 12 for rotation with a driving shaft 22 of the vehicle, a second friction clutch 24 designed to couple the second primary shaft 16 for rotation with the driving shaft 22, and one or more secondary shafts (in the example shown a first secondary shaft 26 and a second secondary shaft 28) carrying a plurality of driven gearwheels (of which only a first driven gearwheel 30 is shown schematically, said gearwheel being carried by the first secondary shaft 26 and meshing permanently with the driving gearwheel 14, together with a second driven gearwheel 32, which is carried by the second secondary shaft 28 and meshes permanently with the driving gearwheel 18) each associated with a respective gear and respective final reduction pinions 34 and 36 permanently meshing with a gearwheel 38 of the differential for transmission of the torque to the drive shafts 40 of the motor vehicle, and therefore to the driving wheels 42. The transmission of the torque may therefore take place both via a first section of the transmission consisting of the first friction clutch 20, the first primary shaft 12 and the first secondary shaft 26, and via a second section of the transmission consisting of the second friction clutch 24, the second primary shaft 16 and the second secondary shaft 28.

In a transmission of this type, the gear changing operation is performed in so-called power shift mode, namely with a phase where the starting gears (disengaging gear) and the end gears (engaging gear), which are each associated with a respective section of the transmission, are simultaneously engaged and transmission of the torque takes place via both sections of the transmission. Transfer of the torque from the disengaging section to the engaging section of the transmission therefore is performed by opening the friction clutch associated with the disengaging gear and simultaneously closing the friction clutch associated with the engaging gear. This phase is referred to herein below as the crossover phase of the friction clutches, or simply as the crossover phase. Opening of a clutch and simultaneous closing of the other clutch must be modulated according to suitable control logics which aim to ensure that the gear changing operation is performed as rapidly and comfortably as possible.

A gear changing operation will be described now in detail, assuming changing from a lower gear associated with the first section of the transmission to a higher gear associated with the second section of the transmission, considering a rigid axle model of the transmission of FIG. 1 and representing the involved parameters and variables with the symbols indicated in the following table.

| Symbol | Description of parameter/variable |
|---|---|
| $C_m$ | torque transmitted by the engine |
| $C_{F,dis}$ | torque transmitted by the friction clutch associated with the disengaging gear |
| $C_{F,inn}$ | torque transmitted by the friction clutch associated with the engaging gear |
| $C_R$ | resistive torque acting on the wheels (including gradient) |
| $\omega_m$ | angular velocity of the driving shaft |
| $\omega_{p,dis}$ | angular velocity of the primary shaft associated with the disengaging gear |
| $\omega_{p,inn}$ | angular velocity of the primary shaft associated with the engaging gear |
| $\omega_R$ | angular velocity of the wheels |
| M | mass of the wheels |
| R | radius of the wheels |
| $J_m$ | moment of inertia of the engine |
| $J_{p,dis}$ | equivalent moment of inertia of the transmission section associated with the disengaging gear |
| $J_{p,inn}$ | equivalent moment of inertia of the transmission section associated with the engaging gear |
| $J_R$ | overall moment of inertia of the four wheels of the vehicle |
| $J_{eq}$ | equivalent moment of inertia at the wheels |
| $\tau_{dis}$ | transmission ratio (including axle ratio) on the transmission section associated with the disengaging gear |
| $\tau_{inn}$ | transmission ratio (including axle ratio) on the transmission section associated with the engaging gear |

The crossover phase of the friction clutches is preceded by a phase where the transmission of the driving power from the engine to the wheels occurs via a single section of the transmission, namely the section associated with the disengaging gear, the first friction clutch 20 (disengaging gear) being closed and the second friction clutch 24 (engaging gear) being open.

The simplified model represented by the following equation therefore applies:

$$(J_m + J_{p,dis}) \cdot \dot{\omega}_m = C_m - \frac{C_R}{\tau}, \quad (1)$$

where the angular velocity $\omega_m$ of the driving shaft 22 is synchronized with the angular velocity $\omega_{p,dis}$ of the first primary shaft 12 (disengaging gear) and where the resistive torque $C_R$ is considered to be constant for the entire gear changing operation.

The equivalent moment of inertia, referred to the primary shaft, of the transmission section associated with the disengaging gear is defined, without taking into account the moments of inertia of the individual shafts of the transmission, by the following equation:

$$J_{p,dis} = \frac{J_{eq}}{\tau^2} = \frac{J_R + M \cdot R^2}{\tau^2}. \quad (2)$$

The gear changing operation provides firstly for engagement of the engaging gear, obtained by means of rotational coupling between the idle gearwheel (which may be equally well the driving gearwheel or the driven gearwheel) of the gearing associated with this gear and the respective shaft (primary or secondary shaft, respectively), typically by means of a sliding engaging sleeve, while the friction clutch associated with the engaging gear is kept open, then the crossover phase of the friction clutches, during which the friction clutch associated with the disengaging gear is gradually opened, while the friction clutch associated with the engaging gear is gradually closed, and finally disengagement of the disengaging gear by means of uncoupling of the idle gearwheel (driving or driven gearwheel) of the gearing associated with this gear from the respective shaft (primary or secondary shaft, respectively).

The simplified model which describes the crossover phase, during which both the clutches are in a slipping condition, is represented by the following equations:

$$J_m \cdot \dot{\omega}_m = C_m - C_{F,inn} - C_{F,dis}; \quad (3)$$

$$J_{eq} \cdot \dot{\omega}_R = \tau_{inn} \cdot C_{F,inn} + \tau_{dis} \cdot C_{F,dis} - C_R; \quad (4)$$

$$\omega_R = \frac{\omega_{p,inn}}{\tau_{inn}} = \frac{\omega_{p,dis}}{\tau_{dis}}. \quad (5)$$

A first constraint imposed in the known strategies for controlling the gear changing operation is the synchronism between the angular velocities $\omega_m$ of the driving shaft 22 and $\omega_{p,dis}$ of the first primary shaft 12 (disengaging gear). The following relation must therefore apply:

$$\omega_m = \omega_{p,dis}. \quad (6)$$

Assuming that the angular velocities $\omega_m$ and $\omega_{p,dis}$ are the same at the start time of the gear changing operation, the synchronism between the angular velocities of the driving shaft 22 and of the first primary shaft 12 (disengaging gear) during the entire crossover phase is ensured if the following relation is satisfied:

$$\dot{\omega}_m(t) = \dot{\omega}_{p,dis}(t) \quad (7)$$

Since $\omega_{p,dis}$ and $\omega_R$ are linked, on the basis of the equation (5), by the following relation:

$$\omega_{p,dis} = \tau_{dis} \cdot \omega_R, \quad (8)$$

and, if the abovementioned condition of synchronism of the angular accelerations expressed by the relation (7) is set, the equation (3) becomes:

$$J_m \cdot \tau_{dis} \cdot \dot{\omega}_R = C_m - C_{F,inn} - C_{F,dis}. \quad (9)$$

Taking $\dot{\omega}_R$ from the equation (4) and substituting it in the equation (9), the following equation which links the torque profiles of the engine and of the two friction clutches 20 and 24 in the condition of synchronism between driving shaft 22 and first primary shaft 12 (disengaging gear) is obtained:

$$J_{eq} \cdot C_m - (J_{eq} + J_m \tau_{inn} \tau_{dis}) \cdot C_{F,inn} - C_{F,dis} \cdot (J_{eq} + J_m \tau_{dis}^2) + J_m \tau_{dis} \cdot C_R = 0. \quad (10)$$

Taking $C_{F,dis}$ from the equation (10), the minimum torque profile of the first friction clutch 20 which ensures synchronism between the angular velocities $\omega_m$ and $\omega_{p,dis}$ of the driving shaft 22 and of the first primary shaft 12 (disengaging gear), respectively, is obtained:

$$\overline{C}_{F,dis} = \frac{1}{1 + \frac{J_m \cdot \tau_{dis}^2}{J_{eq}}} \cdot C_m - \frac{J_{eq} + J_m \cdot \tau_{dis} \cdot \tau_{inn}}{J_{eq} + J_m \cdot \tau_{dis}^2} \cdot C_{F,inn} + \frac{1}{\frac{J_{eq}}{J_m \tau_{dis}} + \tau_{dis}} \cdot C_R. \quad (11)$$

If the first friction clutch 20 (disengaging gear) is controlled with a torque profile greater than the minimum torque profile defined by the equation (11), the previous transmission model with both the friction clutches 20 and 24 in a slipping condition, defined by the equations (3) and (4), is replaced by a new transmission model in which only the second friction clutch 24 is in a slipping condition, while the first friction clutch 20 is closed and therefore the first primary shaft 12 (disengaging gear) rotates at the same angular velocity as the driving shaft 22. This new model is defined by the following equations:

$$\omega_m = \omega_{p,dis} = \frac{\tau_{dis}}{\tau_{inn}} \cdot \omega_{p,inn} = \tau_{dis} \cdot \omega_R; \quad (12)$$

$$(J_m \cdot \tau_{dis}^2 + J_R) \cdot \dot{\omega}_R = (\tau_{inn} - \tau_{dis}) \cdot C_{F,inn} + \tau_{dis} \cdot C_m - C_R. \quad (13)$$

If the open condition of the second friction clutch 24 is set at the beginning of the crossover phase (time t=0), i.e.

$$C_{F,inn}(0)=0, \quad (14)$$

the initial minimum value of $C_{F,dis}$:

$$\overline{C}_{F,dis}(0) = \frac{1}{1 + \frac{J_m \cdot \tau_{dis}^2}{J_{eq}}} \cdot C_m(0) + \frac{1}{\frac{J_{eq}}{J_m \tau_{dis}} + \tau_{dis}} \cdot C_R. \quad (15)$$

is obtained from the equation (11).

If, moreover, the open condition of the first friction clutch is set at the end of the crossover phase (instant t=$t_{fi}$), i.e.

$$C_{F,dis}(t_{fi})=0, \quad (16)$$

the following equation, which links the final value of the engine torque $C_m$ to the final value of the torque $C_{F,inn}$ of the second friction clutch 24 (engaging gear):

$$C_m(t_{fi}) = \left(1 + \frac{J_m \cdot \tau_{inn} \cdot \tau_{dis}}{J_{eq}}\right) \cdot C_{F,inn}(t_{fi}) - \frac{J_m \tau_{dis}}{J_{eq}} \cdot C_R. \quad (17)$$

is obtained from the equation (10).

From the equation (17) it can be seen that, in the case of negligible resistive torques $C_R$, the final torque $C_m(t_{fi})$ of the engine is greater than the final torque $C_{F,inn}(t_{fi})$ of the second friction clutch 24 (engaging gear).

In short, the equation (15) represents a general constraint for selection of the torque profile of the first friction clutch (clutch to be opened) which ensures no slipping of this clutch, while the equation (17) represents the link between the final values of the engine torque and of the torque of the second friction clutch (clutch to be closed) which ensures the synchronism between the angular velocities of the driving shaft and of the first primary shaft (disengaging gear) and the continuity of the angular acceleration at the time of opening of the first friction clutch.

SUMMARY OF THE INVENTION

The object of the present invention is to provide a method for controlling the operation of changing to a higher gear (upshift) in a motor vehicle equipped with a double clutch transmission, which enables to control the loss of longitudinal acceleration of the vehicle during the crossover phase of the friction clutches in a gear changing operation, in particular in an upshift operation.

This and other objects are fully achieved according to the invention by virtue of a control method for controlling the operation of changing from a lower gear to a higher gear in a motor vehicle equipped with an engine, with a driving shaft and with a double clutch transmission including first and second primary shafts, as well as first and second friction clutches operable to connect the first primary shaft and the second primary shaft, respectively, to the driving shaft, the gear changing operation including a crossover phase of the friction clutches during which the first friction clutch associated with the gear to be disengaged is opened and the second friction clutch associated with the gear to be engaged is closed, the method comprising the steps of:

a) defining a torque profile for the first friction clutch during the crossover phase having a given initial value and a zero final value,
b) defining a torque profile for the second friction clutch during the crossover phase having a zero initial value and a given final value, and
c) defining a torque profile for the engine during the crossover phase having a given initial value and a given final value, wherein the torque profiles of the second friction clutch and of the engine are calculated so that the final value (i.e. the value at the end of the crossover phase) of the longitudinal acceleration of the vehicle is equal to a given percentage of the initial value (i.e. the value at the beginning of the crossover phase) of the longitudinal acceleration of the vehicle.

BRIEF DESCRIPTION OF THE DRAWINGS

The features and advantages of the invention will emerge clearly from the detailed description which follows, provided purely by way of non-limiting example with reference to the accompanying drawings, in which.

DETAILED DESCRIPTION OF THE PREFERRED EMBODIMENTS

Figure 1:
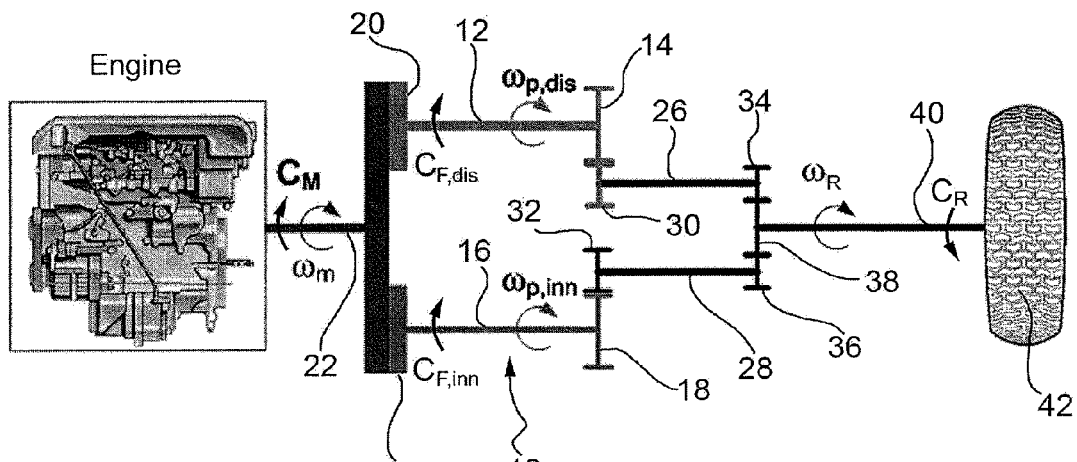
FIG. 1 is a schematic illustration of a double clutch transmission for a motor vehicle.

With reference to the diagram of a double clutch transmission for a motor vehicle shown in FIG. 1 and to the parameters/variables defined above with reference to this diagram, the method for controlling the operation of changing to a higher gear (upshift), and more particularly the crossover phase of the friction clutches, according to a preferred mode of implementation of the present invention, will be described here below.

This preferred mode of implementation of the control method is based on the idea of determining a given profile for the longitudinal acceleration of the vehicle during the crossover phase and defining consequently the profile of the engine torque. If, for example, a constant profile is determined for the longitudinal acceleration of the vehicle, the engine torque is incremented accordingly during the crossover phase.

The longitudinal acceleration of the vehicle is approximately described, without taking into account the elasticity of the gearbox shafts, by the equation:

$$a_x(t) = \qquad\qquad\qquad\qquad\qquad\qquad\qquad\qquad (18)$$
$$R \cdot \dot{\omega}_R = \frac{R}{J_{eq} + J_m \cdot \tau_{dis}^2} \cdot [(\tau_{inn} - \tau_{dis}) \cdot C_{F,inn}(t) + \tau_{dis} \cdot C_m(t) - C_R(t)].$$

where the expression $\dot{\omega}_R$ has been obtained from the equation (13).

From the equation (18), assuming that $C_R$ is constant and considering that $C_{F,inn}$ increases during the crossover phase and that $\tau_{inn}$ is less than $\tau_{dis}$, it follows that, in order to keep the longitudinal acceleration of the vehicle constant during the entire crossover phase, it is necessary to increment $C_m$.

At the start time of the crossover phase (t=0), taking into account that $C_{F,inn}(0)=0$ (the second friction clutch 24 is still open and therefore does not transmit torque), the longitudinal acceleration of the vehicle, on the basis of the equation (13), is equal to:

$$a_x(0) = R \cdot \dot{\omega}_R(0) = \frac{R}{J_m \cdot \tau_{dis}^2 + J_{eq}} (\tau_{dis} \cdot C_m(0) - C_R). \qquad (19)$$

At the end of the crossover phase (t=$t_{fi}$), the first friction clutch 20 is open, the torque is transmitted entirely to the wheels via the transmission section associated with the new gear and the longitudinal acceleration, using the equation (4) and setting $C_{F,dis}=0$, is therefore equal to:

$$a_x(t_{fi}) = R \cdot \dot{\omega}_R(t_{fi}) = \frac{R}{J_{eq}} (\tau_{inn} \cdot C_{F,inn}(t_{fi}) - C_R). \qquad (20)$$

In order for the longitudinal acceleration of the vehicle to be constant during the crossover phase, it is necessary that:

$$a_x(t_{fi}) = a_x(0); \qquad\qquad\qquad\qquad\qquad\qquad (21)$$

and, therefore, on the basis of the equations (19) and (20):

$$C_{F,in}(t_{fi}) = \frac{\tau_{dis}}{\tau_{inn}} \frac{J_{eq}}{J_{eq} + J_m \cdot \tau_{dis}^2} C_m(0) + \frac{\tau_{dis}}{\tau_{inn}} \frac{J_m \cdot \tau_{dis}}{J_{eq} + J_m \cdot \tau_{dis}^2} C_R. \qquad (22)$$

Figure 2:
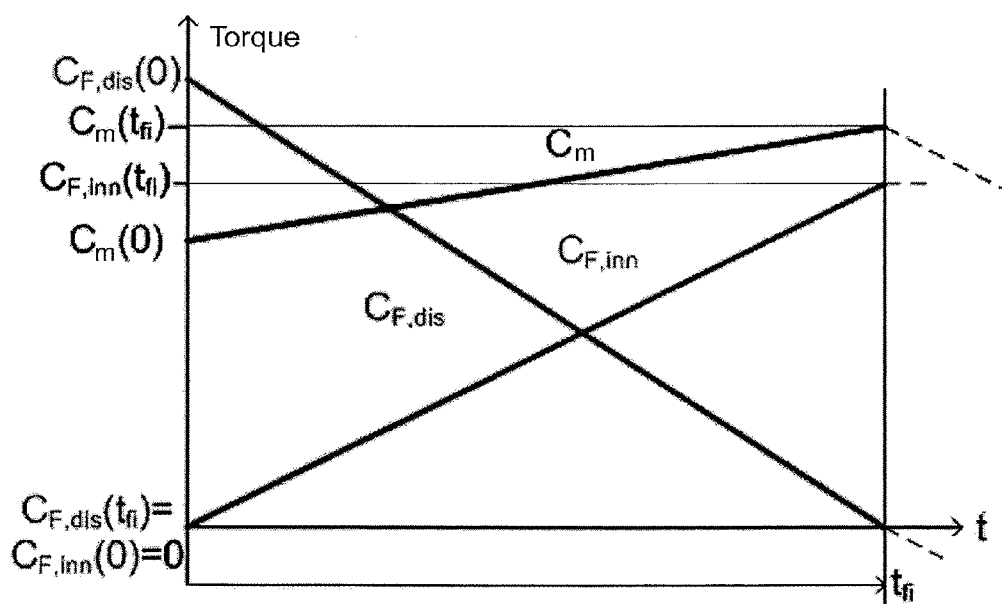
FIG. 2 shows the time courses of the torques of the engine and of the two friction clutches in a double clutch transmission such as that shown in FIG. 1, during the crossover phase of the friction clutches when changing to a higher gear (upshift) by means of a control method according to a preferred mode of implementation of the present invention.

FIG. 2 of the accompanying drawings shows the time course, during the crossover phase, of the torques of the engine and of the two friction clutches according to the preferred mode of implementation of the present invention described above, and more particularly according to a control strategy which envisages determining a constant profile for the longitudinal acceleration of the vehicle during the crossover phase. According to this control strategy, the driving torque is incremented during the crossover phase to such an extent as to obtain a substantially constant profile for the longitudinal acceleration of the vehicle.

The jerk, namely the derivative of the longitudinal acceleration, is defined by the following expression:

$$\dot{a}_x = R \cdot \dot{\omega}_R = \frac{R}{J_m \cdot \tau_{dis}^2 + J_{eq}} \left[ \tau_{dis} \cdot \dot{C}_m + (\tau_{inn} - \tau_{dis}) \cdot \dot{C}_{F,inn} \right]. \quad (23)$$

The derivatives of the engine torque $C_m$ and of the torque of the friction clutch to be closed $C_{F,inn}$ are defined by the following expressions (considering the linear progression of these torques):

$$\dot{C}_m = \frac{C_m(t_{fi}) - C_m(0)}{t_{fi}}; \quad (24)$$

$$\dot{C}_{F,inn} = \frac{C_{F,in}(t_{fi})}{t_{fi}}. \quad (25)$$

Using the expressions of $C_m(t_{fi})$ and $C_{f,inn}(t_{fi})$ provided by the equations (17) and (22), the equations (24) and (25) become:

$$\dot{C}_m = \frac{\frac{(\tau_{dis} - \tau_{inn}) \cdot J_{eq}}{\tau_{inn} \cdot (J_{eq} + J_m \cdot \tau_{dis}^2)} C_m(0) + \frac{\tau_{dis} \cdot (\tau_{dis} - \tau_{inn}) \cdot J_m}{\tau_{inn} \cdot (J_{eq} + J_m \cdot \tau_{dis}^2)} C_R}{t_{fi}}; \quad (26)$$

$$\dot{C}_{F,inn} = \frac{\frac{\tau_{dis} \cdot J_{eq}}{\tau_{inn} \cdot (J_{eq} + J_m \cdot \tau_{dis}^2)} C_m(0) + \frac{\tau_{dis}^2 \cdot J_m}{\tau_{inn} \cdot (J_{eq} + J_m \cdot \tau_{dis}^2)} C_R}{t_{fi}}. \quad (27)$$

If the expressions of $\dot{C}_m$ and $\dot{C}_{F,inn}$ provided by the equations (26) and (27) are substituted in the equation (23), confirmation of zeroing of the jerk is obtained.

Figure 3:
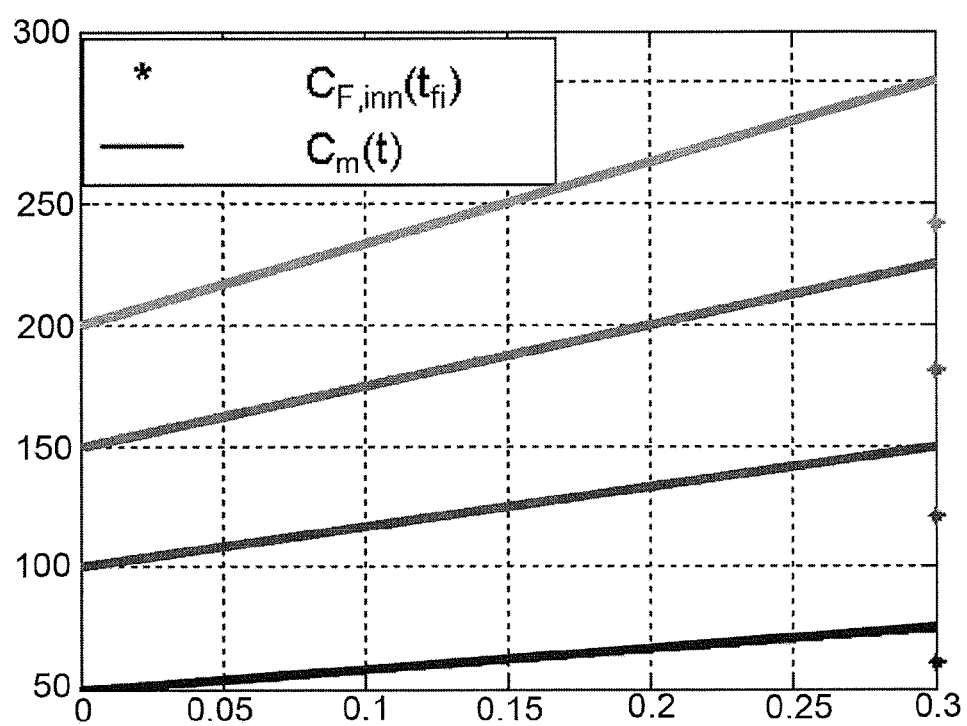
FIG. 3 shows the final values of the torque of the friction clutch to be closed and the time course of the engine torque during the crossover phase of the friction clutches when changing to a higher gear (upshift) by means of a control method according to a preferred mode of implementation of the present invention, for different initial values of the engine torque.

FIG. 3 of the accompanying drawings shows examples of engine torque profiles, with the corresponding final values of the torque of the friction clutch to be closed, which satisfy the condition of constant longitudinal acceleration during the crossover phase when changing from 1st to 2nd gear.

The control method may also be implemented allowing for a certain reduction in the longitudinal acceleration of the vehicle during the crossover phase and therefore determining a final value for the longitudinal acceleration which is equal to a given percentage of the initial value. In this connection, it is pointed out that the expressions "initial value" and "final value" used in the present description and in the claims are to be intended as the value at the at the beginning of the crossover phase and as the value at the end of the crossover phase, respectively.

The main steps to be followed in order to define the torque profiles during the crossover phase in accordance with the control method according to the preferred mode of implementation of the invention described above, assuming that linear torque profiles are chosen (so that only the initial and final values of these profiles and the overall duration of the crossover phase need be defined), are as follows:

a) establishing a final value $a_x(t_{fi})$ of the longitudinal acceleration (equal to the initial value $a_x(0)$ or to a given percentage of this value);
b) calculating the final value $C_{F,inn}(t_{fi})$ of the torque of the friction clutch to be closed on the basis of the equation (20);
c) determining an initial value $C_{F,dis}(0)$ of the torque of the friction clutch to be opened greater than the minimum value $\overline{C}_{F,dis}(0)$ obtained from the equation (15);
d) calculating the final value $C_m(t_{fi})$ of the engine torque on the basis of the equation (17);
e) determining the duration $t_{fi}$ of the crossover phase, taking into account the physical constraints of the clutch actuators, the maximum time accepted for the gear changing operation and the desired jerk;
f) defining the profile of the torque of the friction Clutch to be closed having a zero initial value and a final value equal to the value calculated in step b);
g) defining the profile of the torque of the friction clutch to be opened having an initial value equal to the value calculated in step c) and a zero final value; and
h) defining the profile of the engine torque having an initial value equal to the value $C_m(0)$ detected at the initial time and a final value equal to the value calculated in step d).

If the final value of the engine torque calculated in step d) is greater than the maximum value which the engine is able to provide, then the final value of the engine torque is suitably limited and the final value $C_{F,inn}(t_{fi})$ of the torque of the friction clutch to be closed is calculated by inversion of the equation (17) using the set value $C_m(t_{fi})$.

As regards the torque profile of the friction clutch to be closed, in order to minimize the reduction in the longitudinal acceleration during the period immediately following the crossover phase, it is preferable to use as final value $C_{F,inn}(t_{fi})$ the minimum between the value calculated in step b) (value corresponding to the zero jerk condition) and a target value of the torque intended to be transmitted through the friction clutch associated to the new gear after the crossover phase, i.e. when the angular velocity of the engine is synchronized with the angular velocity of the primary shaft associated to the new gear, such a target value being calculated for instance on the base of the amount of depression of the accelerator pedal.

Owing, therefore, to a suitable definition of the torque profiles, in particular of the engine torque profile, with the control method according to the preferred mode of implementation of the method described above, it is possible to zero or at least minimize the jerk, thus ensuring better performance and greater travel comfort in upshift manoeuvres than in the prior art.

According to an alternative mode of implementation of the control method according to the invention, the final value of the longitudinal acceleration of the vehicle is chosen so as to obtain a constant engine torque profile during the crossover phase (i.e. from the initial time $t=0$ to the final time $t=t_{fi}$). In other words, first the final value of the longitudinal acceleration of the vehicle corresponding to a constant engine torque is calculated, and then the final value of the engine torque is set to be constant and equal to the initial value of the engine torque. Once this constant engine torque value is established, the torque profiles during the crossover phase are determined according to the following steps:

a) calculating the final value $C_{F,inn}(t_{fi})$ of the torque of the second friction clutch 24 (to be closed) by means of the equation (10) so as to ensure synchronism between the angular velocities $\omega_m$ and $\omega_{p,dis}$ of the driving shaft 22 and of the first primary shaft (disengaging gear);
b) setting, on the basis of the desired jerk and of the response limits of the actuators, the reference value of the derivative of the torque $C_{F,inn}$ of the second friction clutch 24 (to be closed) and determining the duration of the crossover phase accordingly; and
c) determining a linear profile for the torque $C_{F,dis}$ of the first friction clutch 20 (to be opened) with an initial value higher than the minimum value provided by the equation (15) and with a zero final value, so as to ensure synchronism between the annular velocities $\omega_m$ and $\omega_{p,dis}$.

Figure 4:
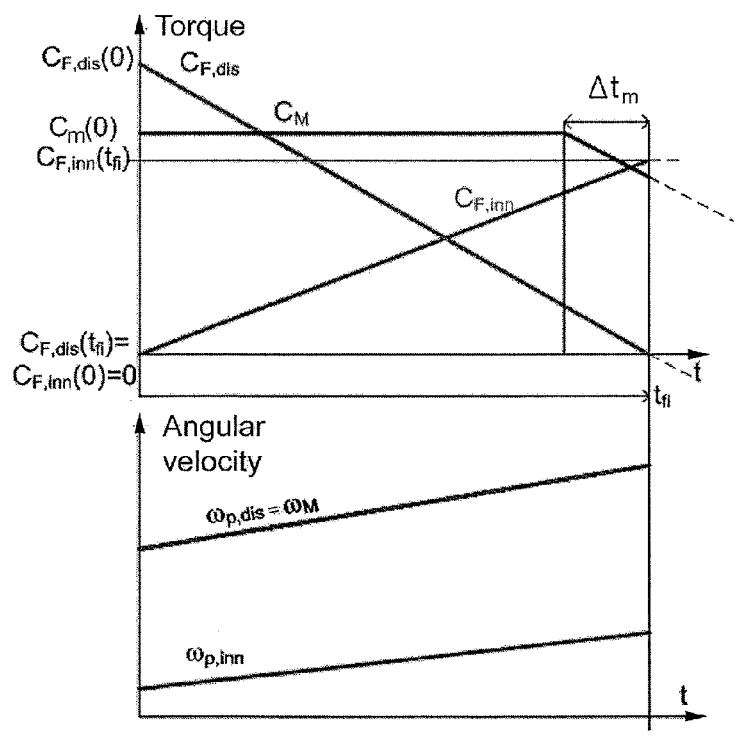
FIG. 4 shows the time courses of the torques and of the angular velocities of the main components of the transmission of FIG. 1 during the crossover phase of the friction clutches when changing to a higher gear (upshift) by means of a control method according to an alternative mode of implementation of the present invention.

FIG. 4 of the accompanying drawings shows two graphs which illustrate the time course of the torques and of the angular velocities in a double clutch transmission for a motor vehicle during the crossover phase of the friction clutches according to the alternative mode of implementation of the control method described above. As can be noted from the first graph, in order to compensate for the delay in response of the engine (indicated in the graph by $\Delta t_m$), the reduction in the engine torque is preferably anticipated with respect to the final time $t_{fi}$ of the crossover phase, i.e. the engine torque $C_m$ is kept constant until the time $t_{fi}-\Delta t_m$ and then decreased (for example linearly) until the time $t_{fi}$.

Figure 5:
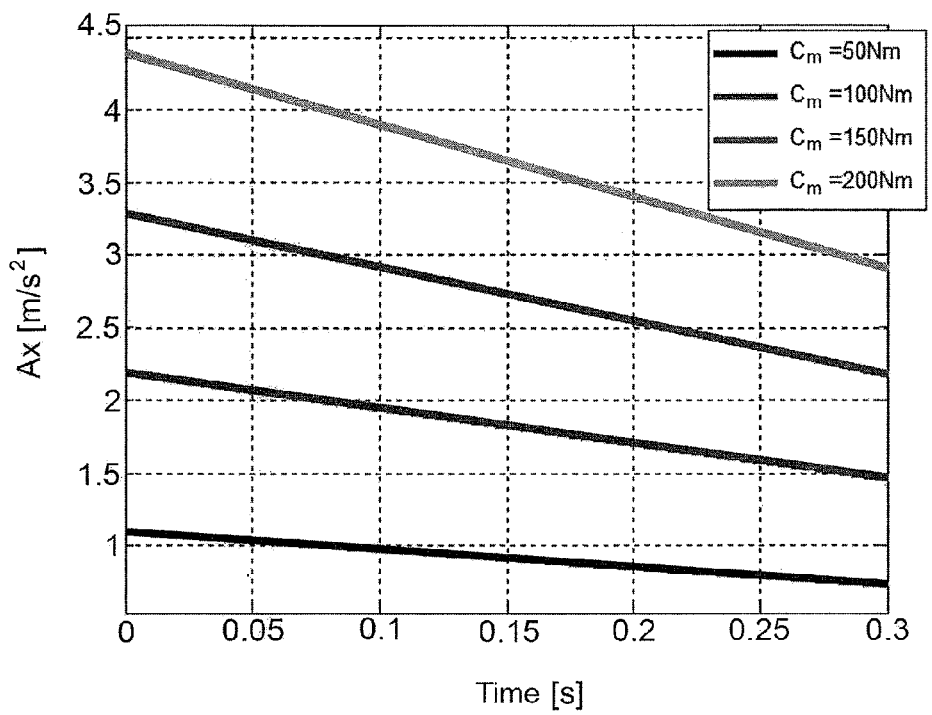
FIG. 5 shows the time course of the longitudinal acceleration of the vehicle during the crossover phase of the friction clutches when changing to a higher gear (upshift) by means of a control method according to an alternative mode of implementation of the present invention.

Leaving aside the effect of the resistive torque $C_R$ and since $\tau_{dis}$ is greater than $\tau_{inn}$ (upshift), determination of a constant engine torque $C_m$ results in a course of the longitudinal acceleration of the vehicle which decreases over time, as can be seen in FIG. 5 which shows by way of example a graph illustrating the time courses of the longitudinal acceleration $A_x$ of the vehicle during the crossover phase when changing from $1^{st}$ to $2^{nd}$ gear in a medium-size/displacement vehicle for different values of the engine torque $C_m$.

The strategy of generating reference torque profiles according to the preferred mode of implementation of the control method according to the invention illustrated in the first part of the description may be combined where necessary with the alternative mode of implementation illustrated in the second part of the description, for example using the former only for medium- or low-load gear changes and for low gears.

Control of the gear changing operation according to the invention may be performed in an open loop, even though closed loop control is preferable in view of the greater robustness.

Naturally, without modifying the principle of the invention, the embodiments and the constructional details may be greatly varied with respect to those described and illustrated purely by way of a non-limiting example.

In this connection, the invention is clearly applicable not only to two-wheel drive vehicles but also to four-wheel drive vehicles, not only to road vehicles but also to off-road vehicles, not only to vehicles with a transverse gearbox but also to vehicles with a longitudinal gearbox and not only to vehicles with synchronizers mounted on the two primary shafts of the gearbox but also to vehicles with synchronizers mounted on the secondary shaft (or secondary shafts) of the gearbox. Moreover, the invention is applicable not only to vehicles with double clutch transmissions, but also to vehicles equipped with a transmission having more than two friction clutches (for example to tractors and industrial vehicles).

What is claimed is:

1. A method for controlling the operation of changing from a lower gear to a higher gear in a motor vehicle equipped with an engine, a driving shaft and a double clutch transmission including first and second primary shafts, as well as first and second friction clutches operable to connect the first primary shaft and the second primary shaft, respectively, to the driving shaft, the gear changing operation including a crossover phase of the friction clutches during which the first friction clutch associated with the gear to be disengaged is opened, starting from a condition in which the angular velocity of the driving shaft is equal to the angular velocity of the first primary shaft, and the second friction clutch associated with the gear to be engaged is closed, the method comprising the steps of:
a) defining a torque profile for the first friction clutch during the crossover phase having a given initial value and a zero final value,
b) defining a torque profile for the second friction clutch during the crossover phase having a zero initial value and a given final value, and
c) defining a torque profile for the engine during the crossover phase having a given initial value and a given final value,
wherein the torque profiles of the second friction clutch and of the engine are calculated so that the final value of the longitudinal acceleration of the vehicle is equal to a given percentage of the initial value of the longitudinal acceleration of the vehicle.

2. Method according to claim 1, wherein the torque profiles defined for the first friction clutch, for the second friction clutch and for the engine during the crossover phase are linear profiles.

3. Method according to claim 1, wherein the final value of the torque profile of the second friction clutch is calculated, the initial value of the engine torque being known, by determining the condition whereby the final value of the longitudinal acceleration of the vehicle is equal to the initial value of the longitudinal acceleration of the vehicle.

4. Method according to claim 1, wherein the final value of the torque profile of the second friction clutch is chosen as a minimum between the value calculated, knowing the initial value of the engine torque, by determining the final value of the longitudinal acceleration of the vehicle and a predetermined target value.

5. Method according to claim 3, wherein the final value of the engine torque profile is calculated, the final value of the torque profile of the second friction clutch being known by determining the final value of the longitudinal acceleration of the vehicle.

6. Method according to claim 1, wherein the initial value of the torque profile of the first friction clutch is chosen so as to be greater than a minimum value calculated by determining the condition of synchronism of the angular velocities of the driving shaft and of the first primary shaft.

7. Method according to claim 1, wherein in step c) a constant torque profile is defined for the engine.

8. A method for controlling the operation of changing from a lower gear to a higher gear in a motor vehicle equipped with an engine, a driving shaft and a double clutch transmission including first and second primary shafts, as well as first and second friction clutches operable to connect the first primary shaft and the second primary shaft, respectively, to the driving shaft, the gear changing operation including a crossover phase of the friction clutches during which the first friction clutch associated with the gear to be disengaged is opened and the second friction clutch associated with the gear to be engaged is closed, the method comprising the steps of:
a) defining a torque profile for the first friction clutch during the crossover phase having a given initial value and a zero final value,
b) defining a torque profile for the second friction clutch during the crossover phase having a zero initial value and a given final value, and
c) defining a torque profile for the engine during the crossover phase having a given initial value and a given final value,
wherein the torque profiles of the second friction clutch and of the engine are calculated so that the final value of the longitudinal acceleration of the vehicle is equal to a given percentage of the initial value of the longitudinal acceleration of the vehicle, and
wherein the final value of the torque profile of the second friction clutch is chosen as a minimum between the value calculated, knowing the initial value of the engine torque, by determining the final value of the longitudinal acceleration of the vehicle and a predetermined target value.

9. Method according to claim 8, wherein the final value of the engine torque profile is calculated, the final value of the torque profile of the second friction clutch being known by determining the final value of the longitudinal acceleration of the vehicle.

10. Method according to claim 8, wherein the initial value of the torque profile of the first friction clutch is chosen so as to be greater than a minimum value calculated by determining the condition of synchronism of the angular velocities of the driving shaft and of the first primary shaft.

* * * * *